Feb. 13, 1968   G. L. WILDE ET AL   3,368,778
HELICOPTER POWER PLANT
Filed Aug. 30, 1965   3 Sheets-Sheet 1

Inventors
Geoffrey Light Wilde
Donald Eyre
By
Cushman, Darby & Cushman
Attorneys Feb. 13, 1968   G. L. WILDE ET AL   3,368,778
HELICOPTER POWER PLANT
Filed Aug. 30, 1965   3 Sheets-Sheet 2
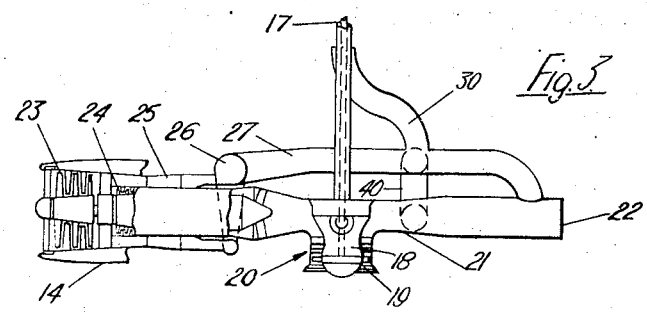
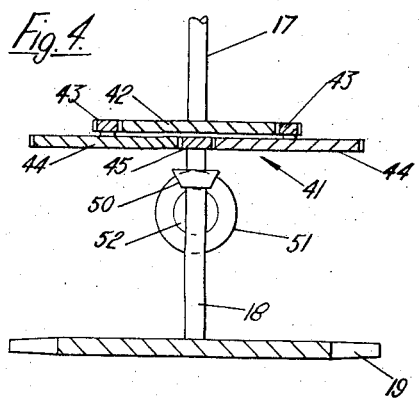
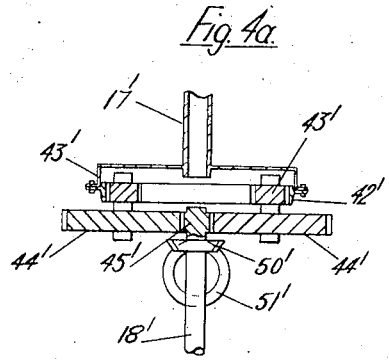
Inventors
Geoffrey Light Wilde
Donald Eyre
By
Cushman, Darby & Cushman
Attorneys

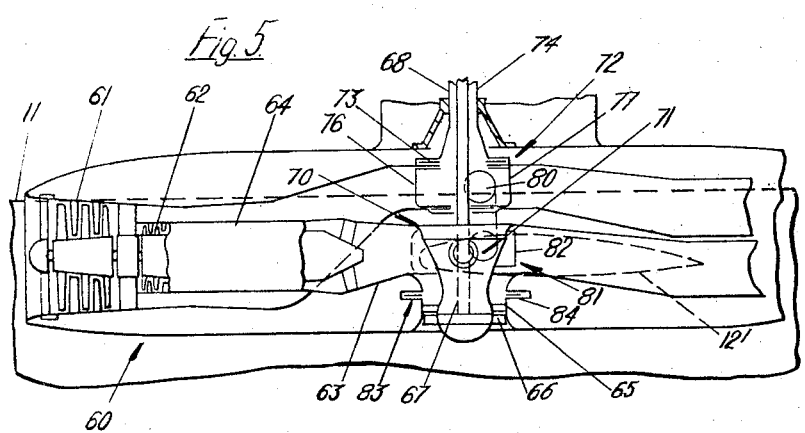
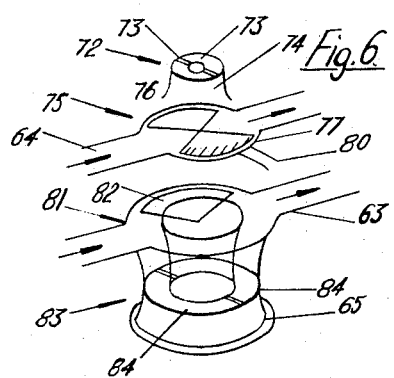
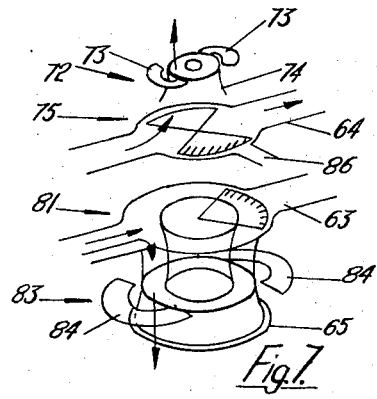
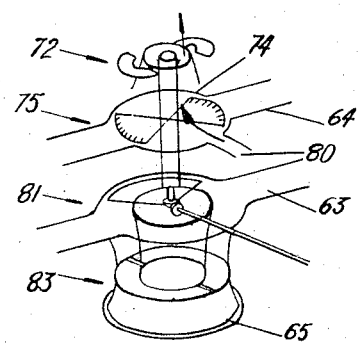
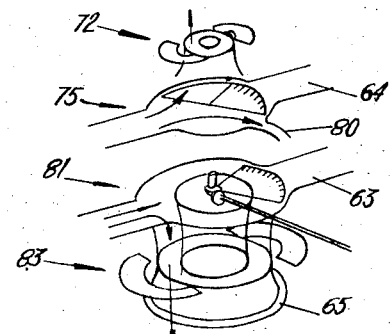

United States Patent Office 3,368,778
Patented Feb. 13, 1968

3,368,778
HELICOPTER POWER PLANT
Geoffrey Light Wilde, Gowers Lane, Turnditch, and Donald Eyre, Alvaston, England, assignors to Rolls-Royce Limited, Derby, England, a British company
Filed Aug. 30, 1965, Ser. No. 483,458
Claims priority, application Great Britain, Sept. 14, 1964, 37,542/64
9 Claims. (Cl. 244—6)

ABSTRACT OF THE DISCLOSURE

Helicopter power plant comprising two rotors having blades with slits therein, two by-pass jet engines, each having a jet nozzle, a free turbine mounted normally to the longitudinal axis of the engine and mechanically driving the rotors, valves selectively directing by-pass air and exhaust gases to the jet nozzle for forward propulsion and to the rotor slits for vertical lift, the rotors being interconnected both mechanically and by means of gas ducting to insure that if one engine fails, the other engine will drive both rotors.

---

This invention relates to a helicopter power plant and to a helicopter provided therewith.

According to the present invention there is provided a helicopter power plant comprising a rotor having slits, a gas turbine jet propulsion engine, at least one propulsion nozzle for said engine, a free turbine mounted for rotation about an axis which is normal to the longitudinal axis of said engine, the free turbine being mechanically coupled to the helicopter rotor, and valve means operable such that, during cruise conditions, the engine gases are directed to said at least one propulsion nozzle of the engine, and, during take-off and landing, a portion of the engine gases is directed through the rotor slits to provide lift and also through said at least one propulsion nozzle, and the remainder is directed to the free turbine.

Valve means are preferably employed operable such that, during cruise conditions by-pass air and exhaust gases are directed to at least one propulsion nozzle of the engine, and, during take off and landing, by-pass air is directed to the rotor and a propulsion nozzle and exhaust gases are directed to the free turbine.

In a preferred embodiment of the present invention the power plant comprises two engines each adapted to drive a rotor through a respective free turbine, the engines being mechanically interconnected whereby, should one engine fail, the remaining engine can drive both rotors. The engines may be connected by gas ducting such that should one engine fail, gases from the remaining engine may be directed to both rotors.

Preferably a valve device is provided on each engine, the arrangement being such that, should one engine fail, the valve device on the failed engine blanks off the free turbine and directs air from the other engine, via said gas duct, to the rotor, the valve device on the other engine directing by-pass air to its rotor and to said gas ducting and directing its exhaust gases to the free turbine. The valve means and valve device as hereinbefore described preferably form parts of a common valve assembly on each engine.

The free turbine and rotor of both or each engine may be mechanically connected by a compound epicyclic gear train.

Preferably the free turbine shafts of the two engines are interconnected by a common drive shaft bevel gear drive being provided between each free turbine shaft and the common drive shaft. The common drive shaft may comprise two half shafts interconnected by a helically splined coupling sleeve which controls phasing of the rotors.

The invention also includes a helicopter provided with power plant as set forth above. Thus the helicopter may be provided with fixed wings on which the engines are mounted, the rotors overlapping over the fuselage of the aircraft.

The invention is illustrated, merely by way of example, in the accompanying drawings, in which.

Figure 1:
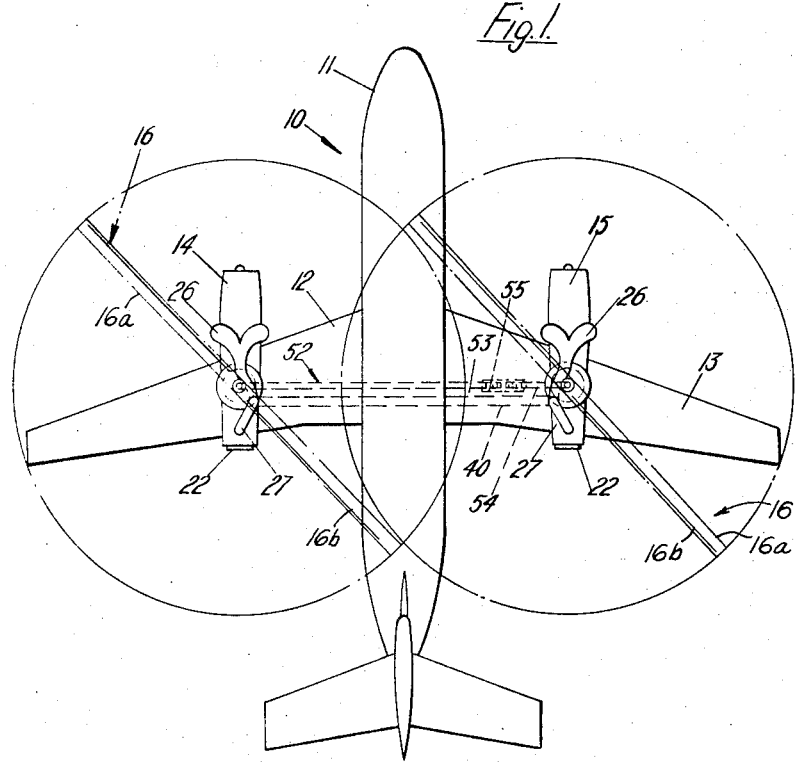
FIGURE 1 is a plan of a helicopter in accordance with the present invention.
Figure 2:
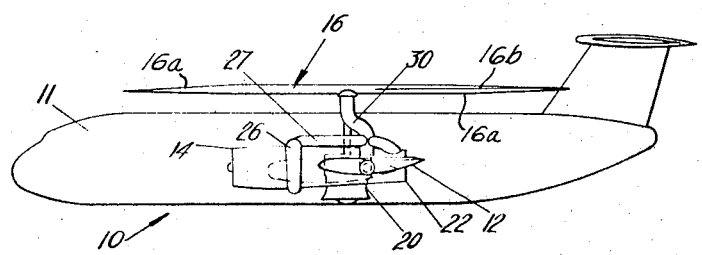
FIGURE 2 is a side elevation of the helicopter of FIGURE 1.

FIGURE 3 is a part-sectional elevation of the power plant of FIGURES 1 and 2 in greater detail, FIGURE 4 is an enlarged view of part of the power plant of FIGURE 3, FIGURE 4A is an enlarged view of an alternative form of the components shown in FIGURE 4, FIGURE 5 is a part-sectional side elevation of an alternative form of power plant for use with the helicopter of FIGURES 1 and 2, and FIGURES 6 to 9 are views of a valve assembly for use in the power plant of FIGURE 5, showing the components of the valve assembly in different relative positions.

Referring to the drawings, there is shown in FIGURES 1 and 2, a helicopter 10 comprising a fuselage 11 on which there are mounted fixed wings 12, 13, gas turbine by-pass jet propulsion engines 14, 15, being mounted on the wings 12, 13. The construction of each of the power plants including engines 14 and 15 are identical and one only will therefore be described in detail hereinafter.

The power plant including engine 14 comprises a bladed rotor 16 having blades 16a connected by a vertically disposed shaft 17 to a shaft 18 of a free turbine 19 which is disposed within a duct 20, disposed at right angles to the longitudinal axis of the engine 14. Duct 20 communicates with an exhaust duct 21 of the engine 14, exhaust gases which do not flow through duct 20 flowing through an exhaust nozzle 22 to atmosphere.

The engine 14 comprises a low pressure compressor 23 and a high pressure compressor 24. Air from low pressure compressor 23 which passes to the high pressure compressor 24 flows through combustion equipment and high pressure and low pressure turbines (not shown) and thus to the exhaust duct 21. Air from the low pressure compressor 23 which does not pass to the high pressure compressor 24 flows through a by-pass duct 25 and to a manifold 26 disposed about the engine. The by-pass air from manifold 26 passes through ducting 27 which communicates with the exhaust duct 21 upstream of the exhaust nozzle 22.

Communicating with the ducting 27 is a further duct 30 which leads by-pass air from ducting 27 to the rotor 16. The blades 16a of the rotor 16 are each hollow and are each provided at least one spanwise extending slit 16b through which the by-pass air fed thereto may be ejected to atmosphere to thus provide lift. By controlling the amount of air ejected to atmosphere through the longitudinal slits 16b in the blades of the rotor 16, it is possible to control the collective and cyclic pitch of the rotor 16 in known manner.

During cruise conditions, by-pass air from ducting 27 is directed to the exhaust duct 21 and thus to the propulsion nozzle 22, no air being provided through the duct 30, and exhaust gases within exhaust duct 21 are directed directly to the exhaust propulsion nozzle 22, no air flowing through the free turbine 19. During take-off and landing, all the exhaust gases of the engine are directed through the free turbine 19, none passing from the exhaust duct 21 to the propulsion nozzle 22, and the by-pass air within ducting 27 is divided, part of it passing through the duct 30 and the remainder passing to the propulsion nozzle 22. A valve arrangement, not shown, is employed to control the flow of by-pass air and exhaust gases in the manner described above.

At the junction of the ducting 27 and duct 30, there is provided a further duct 40 which is common to both engines 14, 15, communicating with the ducting 27 of each engine, as clearly seen in FIGURE 1. Normally the ducting 40 is blanked off from each of the ductings 27 but, should one of the engines fail, the ducting 40 is placed in communication with the ductings 27 of each engine, and the remaining engine which has not failed provides by-pass air through the ducting 40 to the rotor of the failed engine. In this way, should one engine fail, the remaining engine provides by-pass air for both rotors, and thereby maintains the lift on the aircraft.

Referring to FIGURE 4, there is shown in more detail the shafts 17, 18 from which it will be noted that a compound gear train 41 drivingly interconnects these shafts. A gear 42 is provided on shaft 17 and a plurality of layshaft gears 43 surround and mesh with the gear 42. Further layshaft gears 44 are fixed to the layshafts carrying the gears 43 and these surround and mesh with a pinion 45 which is fixed to the shaft 18.

A bevel gear 50 fixed on shaft 18 meshes with a gear wheel 51 on a common shaft 52 which interconnects the shafts 18 of the two engines 14, 15. The common shaft 52 is formed of two half shafts 53, 54 interconnected by a helically splined connecting sleeve 55. It will be appreciated that, should one engine fail during operation, the other engine will drive both rotors, its own rotor directly through the shafts 17, 18 and the rotor of the failed engine via the common shaft 52. The helically splined interconnecting sleeve 55 is provided to phase the rotors correctly, these normally being 90° out of phase, since, as seen in FIGURE 1, they overlap over the fuselage 11.

A multi-plate hydraulic clutch and gear ring lock (not shown) may be incorporated between the gear and the rotor shaft 17 to bring the rotors to rest and stop one rotor in a position in which its longitudinal axis lies parallel to the fuselage, an inching device operated by motor or gas bleed being connected to the other rotor or turbine to position the rotors parallel in the stowed position.

Referring to FIGURE 4A, there is shown an alternative form of the drive shown in FIGURE 4. Similar reference numerals have been used in the two figures to refer to similar components. The major difference between the two systems lies in the connection between the shaft 17 and the gear train; a central gear is not employed, but a gear annulus 42' is used, the annulus 42' being provided with internal teeth which mesh with the layshaft gears 43'.

Referring now to FIGURE 5, there is shown an alternative embodiment of a power plant according to the present invention. In this arrangement, an engine 60 is mounted on a relatively high wing 12' compared with the arrangement shown in FIGURE 2. Thus it will be noted that the engine 60 is disposed adjacent the upper surface of fuselage 11 compared with the embodiment of FIGURE 2 where the engine 14 is mounted below the centre line of fuselage 11. The disadvantage of the FIGURE 2 arrangement is, of course, that an exceptionally long drive shaft 17 is required from the engine to the rotor 16, whereas in the FIGURE 5 embodiment, this shaft may be shortened considerably.

The engine 60 is again a gas turbine by-pass engine but this engine differs from that of the FIGURES 1 to 3 embodiment in that air from a low pressure compressor 61 which does not pass to a high pressure compressor 61 (and thus through combustion equipment and turbines to an exhaust duct 63) passes to a by-pass duct 64. By-pass duct 64 is completely separate from the exhaust duct 63 and does not communicate therewith, but terminates in a further propulsion nozzle (not shown) which is additional to the propulsion nozzle disposed at the downstream end of the exhaust duct 63.

A duct 65 communicates with exhaust duct 63 and has disposed therein a free turbine 66 mounted on a shaft 67 which is disposed at right angles to the longitudinal axis of the engine 60. Shaft 67 is drivingly connected to a shaft 68 via a compound epicyclic gear train 70. The shaft 68 is connected to a rotor of the helicopter as described with reference to FIGURES 1 to 3. The form of the epicyclic gear train 70 may be similar to that shown in FIGURES 4 or 4A. A bevel gear drive 71 similar to the bevel gear drive 50, 51 described with reference to FIGURE 4 is also employed on the engine 60, and a common shaft interconnects the engines of the helicopter as in the FIGURES 1 to 3 embodiment.

Four valves are employed in the engine 60 to control the flow of exhaust gases and by-pass air both to the rotor and free turbine of both the engines employed on the helicopter. A valve 72 including two valve plates 73 is disposed within the duct 74 leading from the by-pass passage 64 to the rotor blades of the helicopter. The valve 72 controls flow of by-pass air through duct 74 to the rotor blades. A valve 75 comprising two valve obturating members 76, 77 is disposed within the by-pass passage 64 and controls flow of air therethrough. The valve 75 also controls flow of by-pass air through a common connecting duct 80 which connects the two engines of the helicopter together (i.e. in a similar manner to the gas duct 40 of the FIGURES 1 to 3 embodiment). A valve 81 comprising a valve obturating member 82 is disposed within the exhaust duct 63 to control flow of exhaust gases therethrough. Finally, a valve 83 is disposed within ducting 65 and comprises two valve plates 84 which control passage of exhaust gases to the free turbine 66.

Operation of the four valves 72, 75, 81 and 83 will now be explained with reference to FIGURES 6 to 9 which show the four valves assembled as a valve assembly.

FIGURE 6 illustrates the position of the components during cruise conditions. The valves 72 and 83 are closed thereby preventing flow of by-pass air and exhaust gases respectively to the rotor blades and free turbine. The valves 75 and 81 are so disposed as to allow free passage of the by-pass air through by-pass passage 64 to its respective propulsion nozzle and flow of the exhaust gases through exhaust duct 63 to its propulsion nozzle, thereby providing maximum cruise conditions.

Referring to FIGURE 7, this shows the arrangement of the components during take-off and landing. In this position, valve 72 is open to allow by-pass air from by-pass passage 64 to pass to the rotors, the remainder of the by-pass air passing through the by-pass passage 64 to provide some forward propulsion. The valve 83 is also open to allow exhaust gases to flow from the exhaust duct 63 into the duct 65 to thereby drive the free turbine 66 and thus rotate the rotors of the helicopter. The valve 81 blocks the exhaust duct 63 downstream of the duct 65 thereby preventing flow of the exhaust gases to its respective propulsion nozzle. Thus, in this arrangement, maximum use is made of the engine gases to drive the turbine 66 and of by-pass air to control and provide lift by rotors of the helicopter.

In both the FIGURE 6 and FIGURE 7 arrangements, the valve 75 is so arranged as to block the communicating passage 80 and thereby prevent flow of by-pass air to the other engine of the helicopter. However, should one of the engines fail, the communicating duct 80 is opened to allow air to pass from the engine which is still operable to the failed engine and thus to its rotor. As shown in FIGURE 8, the valve assembly of the failed engine is shown, from which it will be noted that the valve 72 is open, and the valve 75 is so disposed as to prevent any flow of air through the by-pass passage 64 (there being no air flow from the engine itself, and the valve 75 thus preventing any adverse flow or induced flow of air). The valve 75 opens the communicating duct 80 and thus permits air to flow from the engine which is still operable into the duct 74 and thus to the rotor of the failed engine. No exhaust gases flow through the exhaust duct 63 and the position of the valve 81 is therefore not of importance, but the valve 83 is in its closed position to prevent the induction of any air through the duct 65.

The valve assembly of the engine which is still operable when one of the engines has failed, is shown in FIGURE 9. The valve 72 is open to allow by-pass air from the still operable engine to flow to its rotor. The valve 75 is in a position in which it prevents by-pass air from flowing through the by-pass duct 64 to the propulsion nozzle and thus the by-pass air which does not flow to the rotor is forced to flow through the communicating duct 80 to the rotor of the failed engine. The valve 81 is in a position to prevent flow of exhaust gases through the exhaust duct 63 to the propulsion nozzle and thus all the exhaust gases are forced to flow through the duct 65, the valve 83 being open to allow the exhaust gases to flow to the free turbine 66 and thus drive the rotor of the still operable engine.

Thus, it will be appreciated that, should one engine fail, the engine which is still operable will drive both rotors mechanically and by-pass air from the still operable engine will be ducted to both rotors to thereby control the lift produced by both rotors.

Although the valve arrangement of FIGURES 6 to 9 has been described with reference to the embodiment of FIGURE 5, it will be appreciated that a similar valve assembly may be employed with the embodiment of FIGURES 1 to 3.

We claim:

1. Helicopter power plant comprising a rotor having blades with slits, a gas turbine by-pass jet propulsion engine, a free turbine mounted for rotation about an axis which is normal to the longitudinal axis of said engine, the free turbine being mechanically coupled to the helicopter rotor, means for directing the exhaust gases to said free turbine and means for directing the by-pass air to said rotor and through said slits to provide lift.

2. Helicopter power plant comprising a rotor having blades with slits, a gas turbine by-pass jet propulsion engine, at least one propulsion nozzle for said engine, a free turbine mounted for rotation about an axis which is normal to the longitudinal axis of said engine, the free turbine being mechanically coupled to the helicopter rotor, and valve means operable such that, during cruise conditions, by-pass air and exhaust gases are directed to at least one propulsion nozzle of the engine, and, during take-off and landing, by-pass air is directed through said slits and a propulsion nozzle, and exhaust gases are directed to the free turbine.

3. Helicopter power plant comprising two rotors having blades with slits, two jet propulsion engines, a free turbine for each engine mounted for rotation about an axis which is normal to the longitudinal axis of its respective engine, the free turbine being mechanically coupled to its respective helicopter rotor, means for directing gases from each engine to its free turbine, means for directing some of the gases from each engine to its rotor where it is ejected through the slits in the blades of the rotor to provide lift, means mechanically interconnecting the engines whereby, should one engine fail, the remaining engine can drive both rotors and gas ducting interconnecting said engines such that, should one engine fail, gases from the remaining engine may be directed to both rotors.

4. Helicopter power plant comprising two rotors having blades with slits, two jet propulsion engines, a free turbine for each engine mounted for rotation about an axis which is normal to the longitudinal axis of its respective engine, the free turbine being mechanically coupled to its respective helicopter rotor, means for directing gases from each engine to its free turbine, means for directing some of the gases from each engine to its rotor where it is ejected through the slits in the blades of the rotor to provide lift, means mechanically interconnecting the engines whereby, should one engine fail, the remaining engine can drive both rotors, gas ducting interconnecting said engines such that, should one engine fail, gases from the remaining engine may be directed to both rotors, and a valve device on each engine, the arrangement being such that, should one engine fail, the valve device on the failed engine blanks off the free turbine and directs air from the other engine, via said gas duct, to the rotor of said one engine, the valve device on the other engine directing the by-pass air to its rotor and to said gas ducting and directings its exhaust gases to its free turbine.

5. Power plant as claimed in claim 4 wherein said engines are gas turbine by-pass jet propulsion engines, said plant including a common valve assembly on each engine, each valve assembly comprising said valve device and a valve means operable such that, during cruise conditions, by-pass air and exhaust gases are directed to at least one propulsion nozzle of the engine, and, during take-off and landing, by-pass air is directed through said slits and a propulsion nozzle, and exhaust gases are directed to the free turbine.

6. Helicopter power plant as claimed in claim 2 wherein the free turbine is mounted for rotation about an axis which is coaxial with the helicopter rotor, a compound epicyclic gear train being provided for mechanically coupling the free turbine to the helicopter rotor.

7. Helicopter power plant as claimed in claim 3 wherein said means mechanically interconnecting the engines comprises a common drive shaft interconnecting the shafts of said free turbines, and bevel gear drives between each free turbine and said drive shaft.

8. Helicopter power plant as claimed in claim 7 wherein the said two rotors overlap in operation, said common drive shaft comprising two half-shafts and a helically splined coupling sleeve interconnecting the half-shafts to control phasing of the rotors.

9. Helicopter power plant comprising a rotor having blades with slits, a gas turbine jet propulsion engine, at least one propulsion nozzle for said engine, a free turbine mounted for rotation about an axis which is normal to the longitudinal axis of said engine, the free turbine being mechanically coupled to the helicopter rotor, and valve means operable such that, during cruise conditions, the engine gases are directed to said at least one propulsion nozzle of the engine, and, during take-off and landing, a portion of the engine gases is directed through said slits to provide lift and also through said at least one propulsion nozzle, and the remainder is directed to the free turbine.

References Cited

UNITED STATES PATENTS

| 2,612,962 | 10/1952 | Lewis | 244—17.23 X |
| 2,715,506 | 8/1955 | Peterson | 244—7 |
| 2,831,543 | 4/1958 | Matthews | 170—135.4 |
| 3,096,041 | 7/1963 | Cheeseman et al. | 244—7 |
| 3,116,036 | 12/1963 | Nichols | 244—7 |
| 3,156,434 | 11/1964 | Harrington | 244—7 |

FOREIGN PATENTS

| 818,487 | 9/1959 | Great Britain. |

FERGUS, S. MIDDLETON, *Primary Examiner.*

MILTON BUCHLER, *Examiner.*

A. E. CORRIGAN, T. W. BUCKMAN,
*Assistant Examiners.*